(12) United States Patent
Sun (10) Patent No.: US 10,189,173 B1
(45) Date of Patent: Jan. 29, 2019

(54) PNEUMATIC TOOL

(71) Applicant: STORM PNEUMATIC TOOL CO., LTD., Taichung (TW)

(72) Inventor: Yung Yung Sun, Taichung (TW)

(73) Assignee: Storm Pneumatic Tool Co., Ltd., Taichung (TW)

(*) Notice: Subject to any disclaimer, the term of this patent is extended or adjusted under 35 U.S.C. 154(b) by 0 days.

(21) Appl. No.: 15/814,819

(22) Filed: Nov. 16, 2017

(51) Int. Cl.
| | | |
|---|---|---|
| *B25D 9/00* | (2006.01) | |
| *B26F 1/38* | (2006.01) | |
| *B26D 5/04* | (2006.01) | |
| *B25D 9/08* | (2006.01) | |
| *A47J 43/09* | (2006.01) | |
| *B26D 1/00* | (2006.01) | |

(52) U.S. Cl.
CPC .......... *B26F 1/382* (2013.01); *B25D 9/08* (2013.01); *B26D 5/04* (2013.01); *A47J 43/09* (2013.01); *B26D 1/0006* (2013.01)

(58) Field of Classification Search
CPC ... B26F 1/382; B25D 9/08; B25D 9/04; A47J 43/09; B26D 1/0006
See application file for complete search history.

(56) References Cited

U.S. PATENT DOCUMENTS

| | | | | |
|---|---|---|---|---|
| 1,829,609 A | * | 10/1931 | Robinson | B25D 9/08 173/135 |
| 3,642,077 A | * | 2/1972 | Bayard | B25D 9/08 123/73 R |
| 6,209,659 B1 | * | 4/2001 | Blessing | B25D 9/04 173/109 |
| 2010/0275448 A1 | * | 11/2010 | Sun | B23D 51/18 30/277.4 |

* cited by examiner

*Primary Examiner* — Omar Flores Sanchez
(74) *Attorney, Agent, or Firm* — C. G. Mersereau; DeWitt, Mackall, Crounse & Moore, S.C.

(57) ABSTRACT

A pneumatic tool has a hollowed main body. One end of the main body is assembled with a pneumatic motor having a transmission shaft inserted into the main body. The other end of the main body is assembled with a connecting member being slidable along an axial direction of the main body. One end of the connecting member forms a connecting portion, and the other end of the connecting member forms a knife assembling portion. A driving gear is rotatably assembled in the main body and engaged with the transmission shaft. A protruding post is assembled on a portion of the driving gear biasing from an axis of the driving gear. A linking bar has a first end and a second end opposite to the first end. The first end is pin-jointed to the protruding post, and the second end is pin-jointed to the connecting portion of the connecting member.

5 Claims, 8 Drawing Sheets

PNEUMATIC TOOL

BACKGROUND OF THE INVENTION

Field of the Invention

The present invention relaters to an automatic hand tool, in particular to a pneumatic tool capable of driving knifes to be moved reciprocately.

Description of the Prior Art

Figure 7:
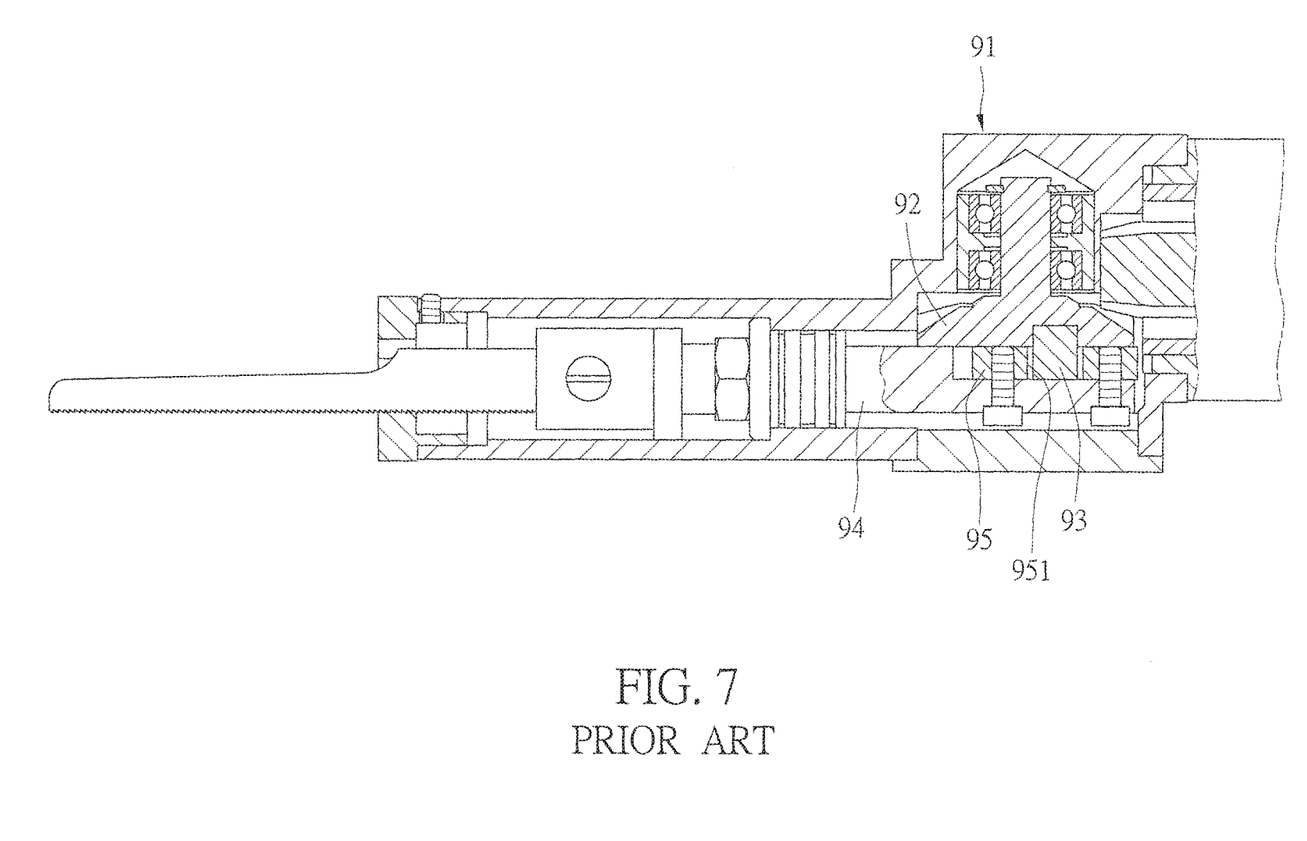
FIG. 7 illustrates a structure view of a conventional pneumatic saw.
Figure 8:
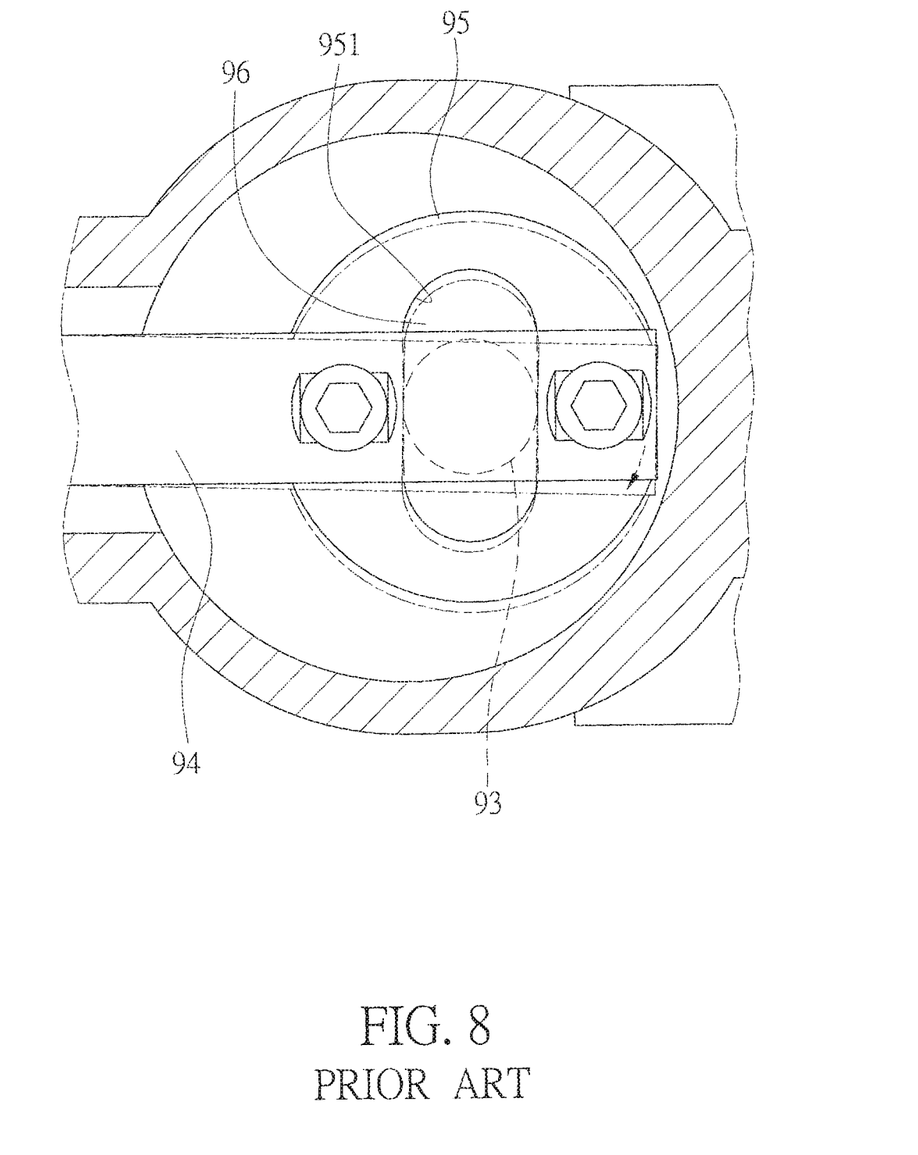
FIG. 8 illustrates a schematic operational view showing the deflection of the conventional pneumatic saw during operation.

As shown in FIGS. 7 and 8, a conventional pneumatic saw driving structure is illustrated. A driving gear 92 is assembled in the pneumatic saw 91, and an eccentric post 93 is assembled on the driving gear 92. A transmission block 95 is fixedly assembled at an end portion of a saw plate unit 94. The transmission block 95 has an elongate slot 951, and the eccentric post 93 can be slidably abutted against the elongate slot 951. When the driving gear 92 is rotated, the eccentric post 93 pushes the transmission block 95 to move along the elongate slot 951, so that the saw plate unit 94 can perform a reciprocate motion in a linear housing.

However, in such mechanism, the elongate slot 951 needs to have a space for sliding the eccentric post 93. Therefore, a gap 96 is formed between the eccentric post 93 and the elongate slot 951. In other words, in such mechanism, the transmission block 95 at the end portion of the saw plate unit 94 is not fixed with the eccentric post 93 and can be slid relative to the eccentric post 93. As a result, when the saw plate unit 94 performs a fast reciprocate motion, the saw plate unit 94 is not steadily positioned and may deflected easily, resulting the wearing of the components and the noise issue.

SUMMARY OF THE INVENTION

One object of the present invention is to provide a pneumatic tool which has a simple structural design and can perform transmission efficiently.

In view of these, a pneumatic tool is provided. In one embodiment, the pneumatic tool comprises a main body, a driving gear, and a linking bar. The main body is hollowed and has a receiving space. One of two ends of the main body is assembled with a pneumatic motor, and the pneumatic motor has a transmission shaft inserted into the receiving space. The transmission shaft comprises a transmission tooth portion. A connecting member is assembled in the other end of the main body, and the connecting member is slidable along an axial direction of the main body. One of two ends of the connecting member toward the receiving space forms a connecting portion, and the other end of the connecting member distant from the receiving space forms a knife assembling portion. The driving gear is rotatably assembled in the receiving space. The driving gear has a gear groove portion, and the gear groove portion is engaged with the transmission tooth portion. A protruding post is assembled on a portion of the driving gear biasing from an axis of the driving gear. A linking bar has a first end and a second end opposite to the first end. The first end of the linking bar is pin jointed to the protruding post, so that the first end of the linking bar is pivotable relative to the protruding post, the first end of the linking bar is not shiftable relative to the protruding post. The second end of the linking bar is pin-jointed to the connecting portion of the connecting member, so that the second end of the linking bar is pivotable relative to the connecting portion of the connecting member, the second end of the linking bar is not shiftable relative to the connecting portion of the connecting member.

In one embodiment, the knife assembling portion is formed by an engaging block inserted into the other end of the connecting member, and the engaging block has a cut groove for engaging with a knife.

In one embodiment, a tubular member being hollowed and tubular shaped is fixedly assembled in the other end of the main body, and the connecting member is inserted into the tubular member. Two protruding ring portions are formed at an outer periphery of the connecting member and spaced from each other, and the two protruding ring portions of the connecting member are abutted against an inner wall of the tubular member, respectively.

In one embodiment, the first end of the linking bar has a first through hole, and a first slidable member is received in the first through hole. The first slidable member is hollowed and ring shaped, and the first slidable member has a first outer wall and a first inner wall. A shape of an outer periphery of the first outer wall corresponds to a shape of an inner periphery of the first through hole, and the first outer wall of the first slidable member is abutted against the inner periphery of the first through hole, the protruding post has a post body. A shape of the first inner wall corresponds to a shape of the post body of the protruding post, and the post body of the protruding post is inserted into the first slidable member and abutted against the first inner wall of the first slidable member. The second end of the linking bar has a second through hole, and a second slidable member is received in the second through hole. The second slidable member is hollowed and ring shaped, and the second slidable member has a second Outer wall and a second inner wall. A shape of an outer periphery of the second outer wall corresponds to a shape of an inner periphery of the second through hole, and the second outer wall of the second slidable member is abutted against the inner periphery of the second through hole. A positioning post has a post body, a shape of the second inner wall corresponds to a shape of the post body of the positioning post. The post body of the positioning post is inserted into the connecting portion and the second through hole of the linking bar, and the post body of the positioning post is abutted against the second inner wall of the second slidable member.

In one embodiment, the connecting portion is formed by two protruding ear portions spaced from each other, and the two protruding ear portions have openings defined along a same axial direction. The second end of the linking bar is extended between the two protruding ear portions of the connecting portion, the second through hole and the openings of the two protruding ear portions are aligned in the same axial direction, and the post body of the positioning post is inserted into the openings and the second through hole.

DETAIL DESCRIPTION OF THE PREFERRED EMBODIMENTS

Please refer to FIGS. 1 to 4, in this embodiment, a pneumatic tool 10 is provided, and the pneumatic tool 10 comprises a main body 11, a driving gear 21, and a linking bar 31.

The main body 11 is a hollowed shell with two ends thereof being communicating with each other. A receiving space 12 is formed in the main body 11. One of two ends of the main body 11 is assembled with a pneumatic motor 13, and the pneumatic motor 13 has a transmission shaft 14 inserted into the receiving space 12. The transmission shaft 14 comprises a transmission tooth portion 141. A connecting member 15 is assembled in the other end of the main body 11 and being slidable along an axial direction of the main body 11. One of two ends of the connecting member 16 toward the receiving space 12 forms a connecting portion 16. The connecting portion 16 is formed by two protruding ear portions 161 spaced from each other, and the two protruding ear portions 161 have openings 162 defined along a same axial direction. The other end of the connecting member 15 distant from the receiving space 12 comprises a knife assembling portion 17. The knife assembling portion 17 is formed by an engaging block inserted into the other end of the connecting member 15, and the engaging block has a cut groove 171 for engaging with a knife 61 (e.g., a saw or a file). Furthermore, in this embodiment, a tubular member 18 being hollowed and tubular shaped is fixedly assembled in the other end of the body 11, and the connecting member 15 is inserted into the tubular member 18. Two protruding ring portions 151 are formed at an outer periphery of the connecting member 15 and spaced from each other, and the two protruding ring portions 151 of the connecting member 15 are abutted against an inner wall of the tubular member 18, respectively.

Furthermore, an inner wall of the main body 11 opposite to the receiving space 12 is recessed to form a recessed groove 111, and a ball bearing 19 is assembled in the recessed groove 111. The driving gear 21 is formed by a bevel gear. One of two ends of the driving gear 21 forms a pivot shaft 22, and the other end of the driving gear 21 forms a gear groove portion 23. The pivot shaft 22 of the driving gear 21 is pivotally connected with a shaft hole 191 of the ball bearing 19, so that the driving gear 21 is rotatably pivoted in the receiving space 12. A protruding post 24 is assembled on a portion of the driving gear 21 biasing from an axis of the driving gear 21. The transmission tooth portion 141 of the transmission shaft 14 is engaged with the gear groove portion 23, so that the transmission shaft 14 can drive the driving gear 21 to rotate.

The protruding post 24 and the connecting portion 16 of the connecting member 15 are connected with each other by the linking bar 31. The linking bar 31 has a first end 32 and a second end 33 opposite to the first end 32. The first end 32 of the linking bar 31 is pivoted with the protruding post 24, and the second end 33 of the linking bar 31 is pivoted with the connecting portion 26 of the connecting member 15. In this embodiment, the first end 32 of the linking bar 31 has a first through hole 321, and a first slidable member 41 formed by a needle roller bearing is received in the first through hole 321. The first slidable member 41 is hollowed and ring shaped, and the first slidable member 41 has a first outer wall 42 and a first inner wall 43. A shape of an outer periphery of the first outer wall 42 corresponds to a shape of an inner periphery of the first through hole 321, so that the first outer wall 42 of the first slidable member 41 is abutted against the inner periphery of the first through hole 321. A shape of the first inner wall 43 corresponds to a shape of a post body 241 of the protruding post 24. The post body 241 of the protruding post 24 is inserted into the first slidable member 41 and abutted against the first inner wall 43 of the first slidable member 41, so that the protruding post 24 can be pin-jointed to the first end 32 of the linking bar 31. Therefore, the first end 32 of the linking bar 31 is pivotable relative to the protruding post 24. The first end 32 of the linking bar 31 is not shiftable relative to the protruding post 24.

The second end 33 of the linking bar 31 is extended between the two protruding ear portions 161 of the connecting portion 16. The second end 33 of the linking bar 31 has a second through hole 331, and the second through hole 331 and the openings 162 of the protruding ear portions 161 are aligned in a same axial direction. A second slidable member 51 formed by a needle roller bearing is received in the second through hole 331. The second slidable member 51 is hollowed and ring shaped, and the second slidable member 51 has a second outer wall 52 and a second inner wall 53. A shape of an outer periphery of the second outer wall 52 corresponds to a shape of an inner periphery of the second through hole 331, so that the second outer wall 52 of the second slidable member 51 is abutted against the inner periphery of the second through hole 331. A shape of the second inner wall 53 corresponds to a shape of a post body 341 of a positioning post 34. The post body 341 of the positioning post 34 is inserted into the openings 162 of the connecting portion 16 and the second through hole 331 of the linking bar 31, and the post body 341 of the positioning post 34 is abutted against the second inner wall 53 of the second slidable member 51, so that the second end 33 of the linking bar 31 is pin-jointed to the connecting portion 16 of the connecting member 15. Therefore, the second end 33 of the linking bar 31 is pivotable relative to the connecting portion 16 of the connecting member 15. The second end 33 of the linking bar 31 is not shiftable relative to the connecting portion 16 of the connecting member 15.

Figure 1:
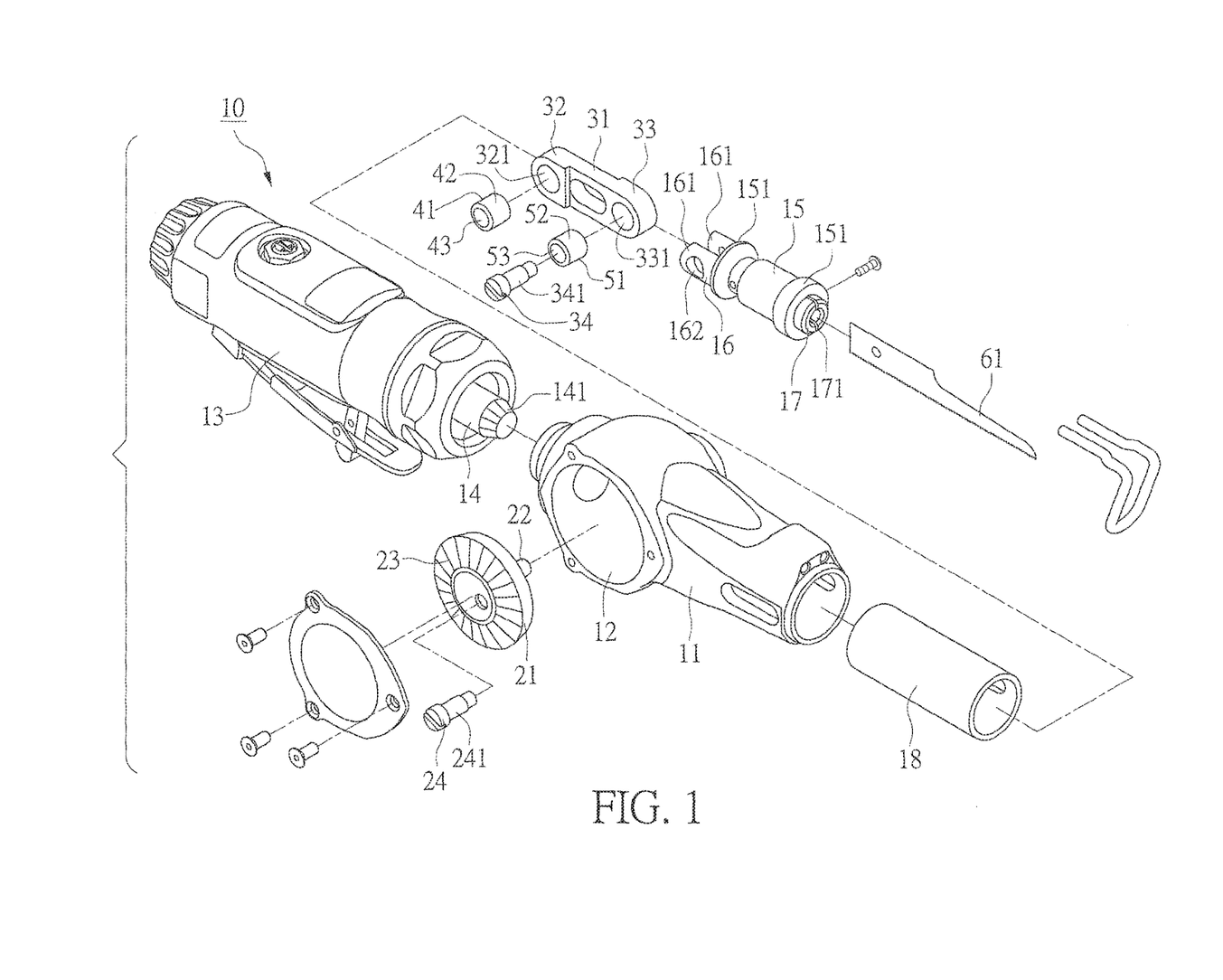
FIG. 1 illustrates an exploded view of a pneumatic tool according an embodiment of the present invention.
Figure 2:
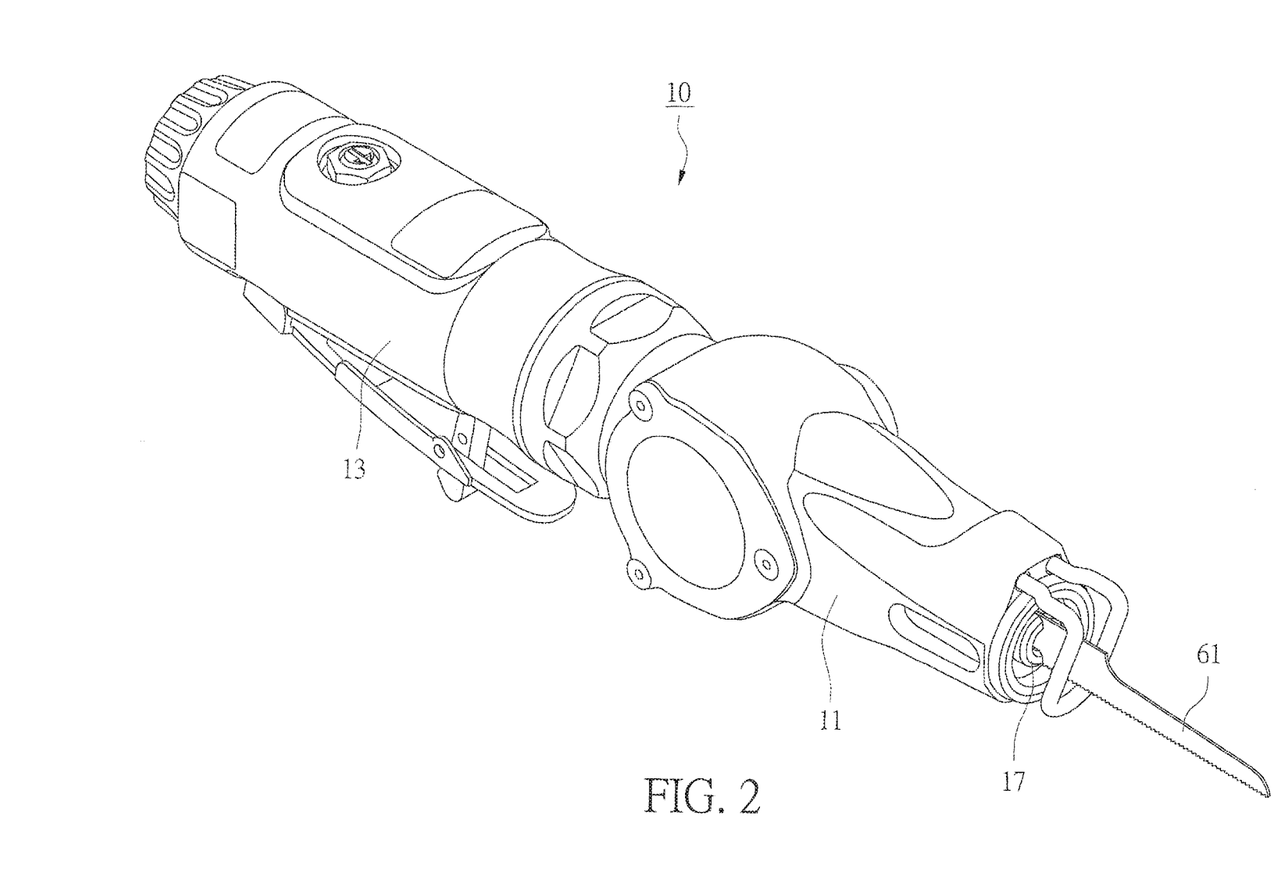
FIG. 2 illustrates an assembled perspective view of the pneumatic tool.
Figure 3:
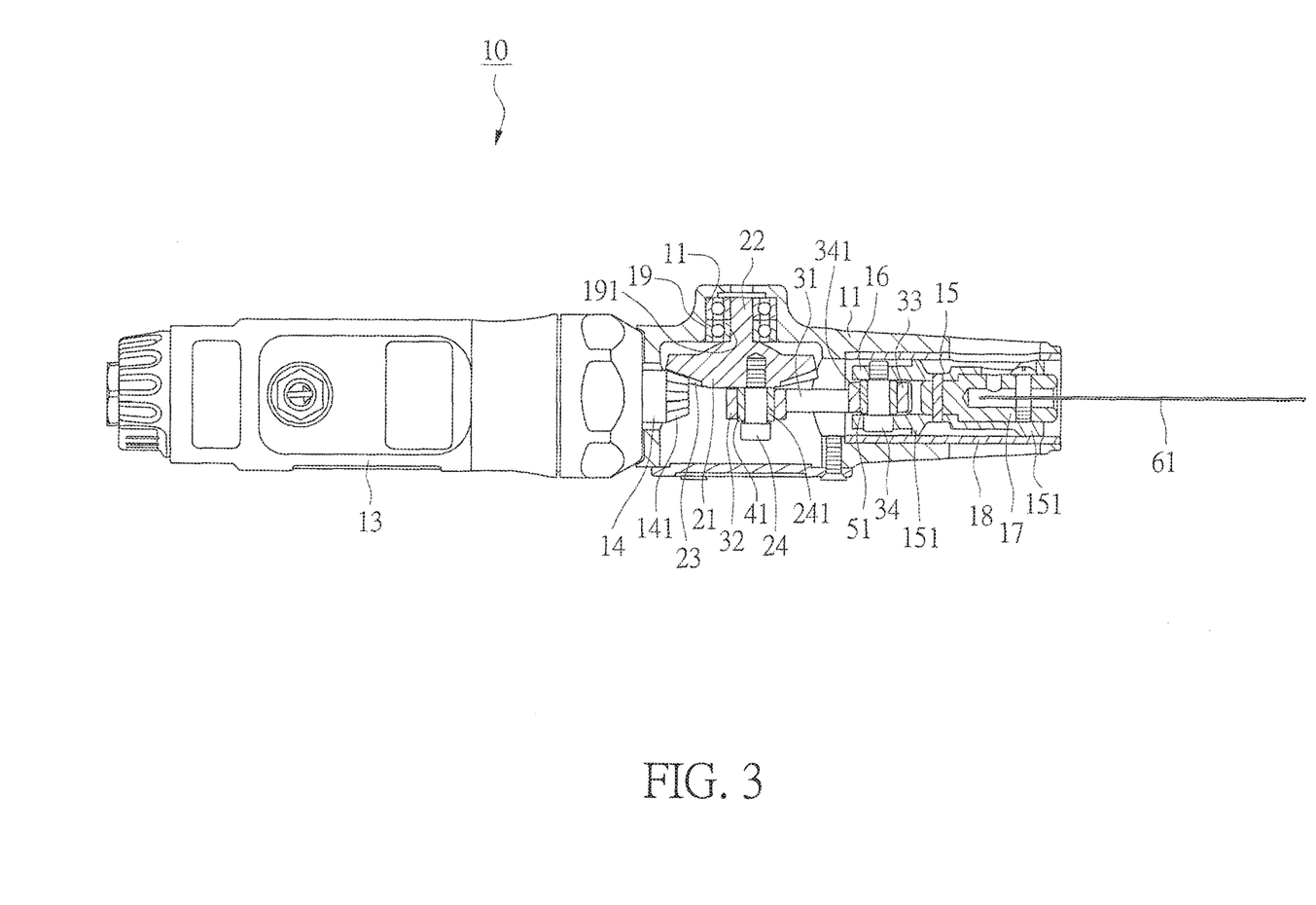
FIG. 3 illustrates a sectional view of the pneumatic tool.
Figure 4:
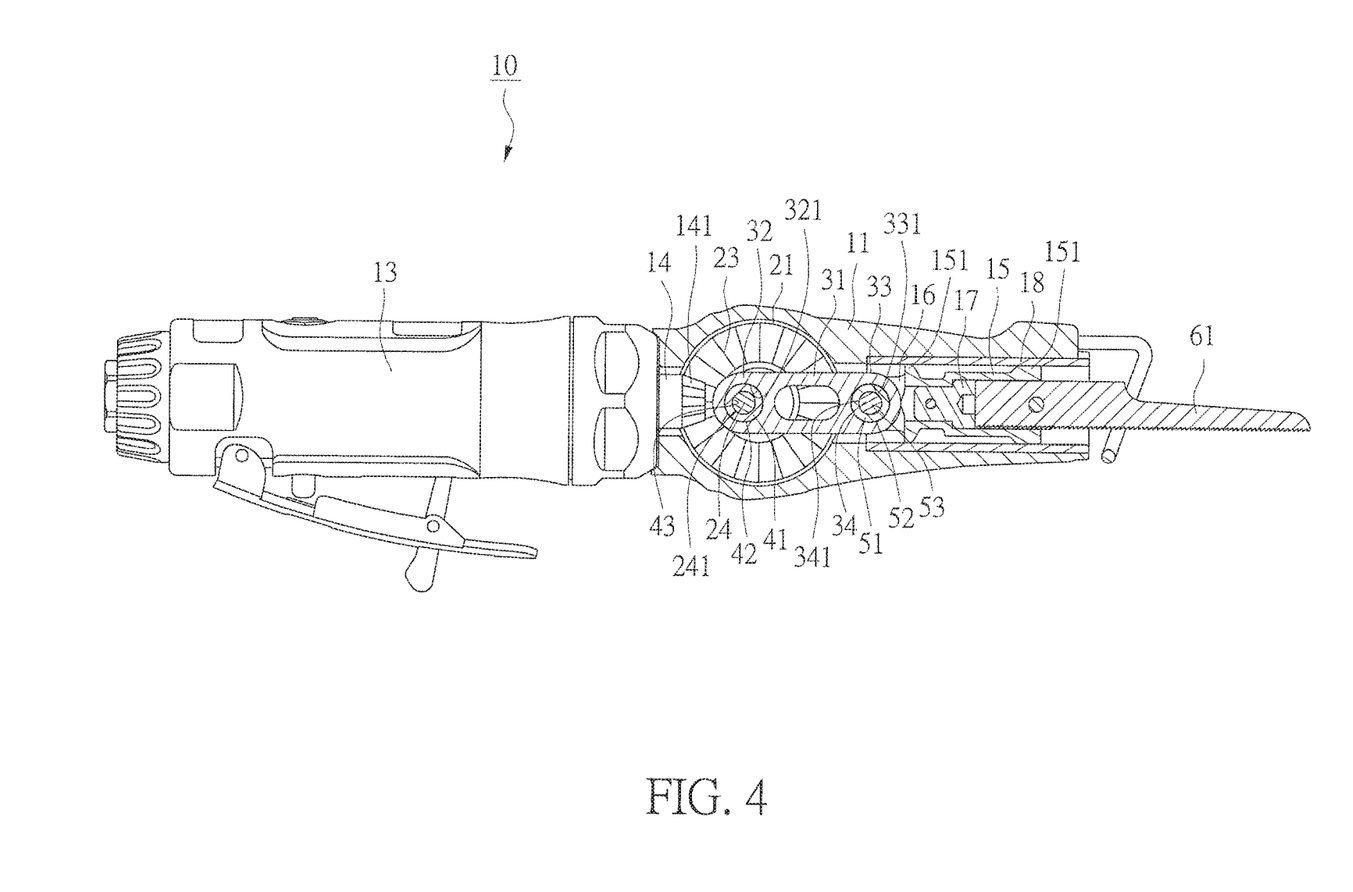
FIG. 4 illustrates another sectional view of the pneumatic tool.
Figure 5:
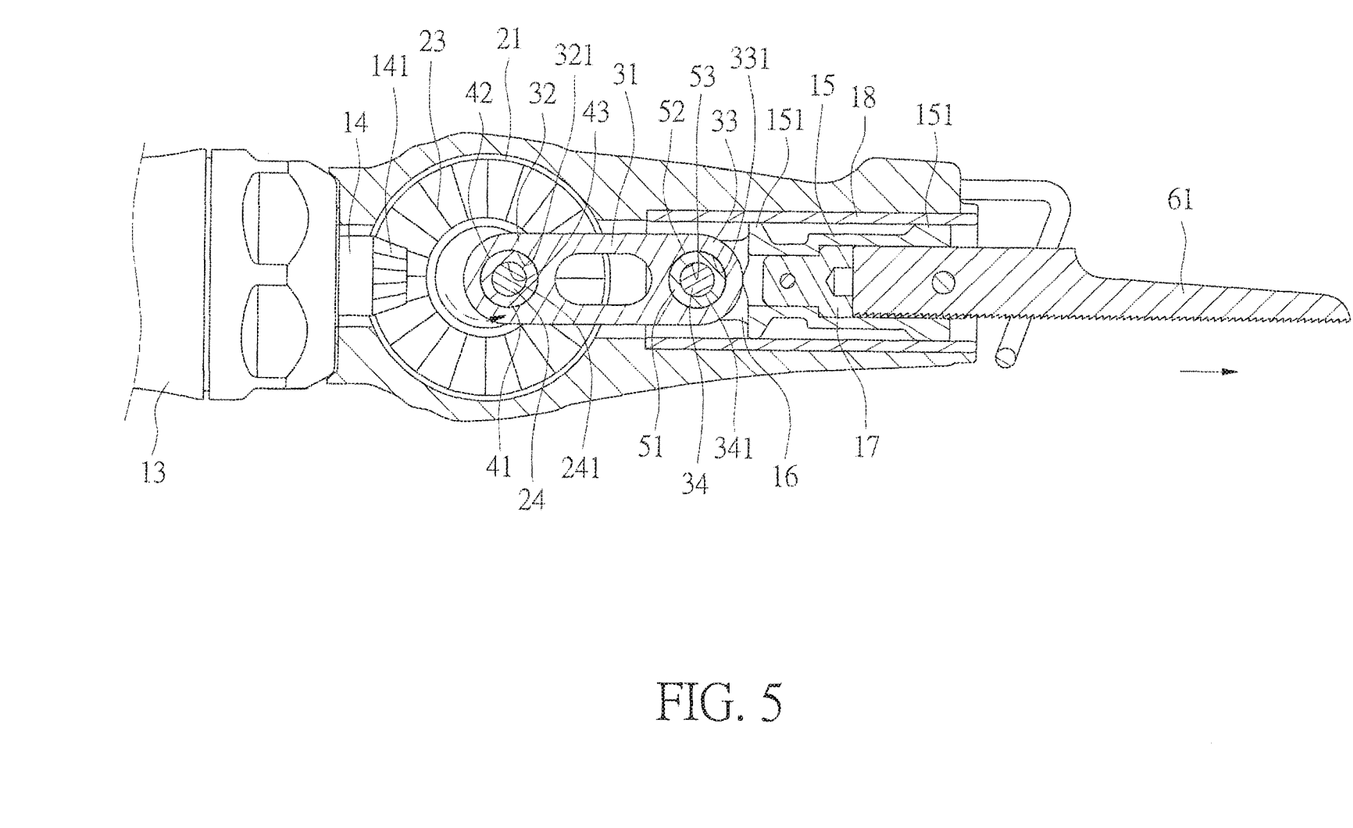
FIGS. 5 and 6 illustrate schematic operational views of the pneumatic tool.
Figure 6:
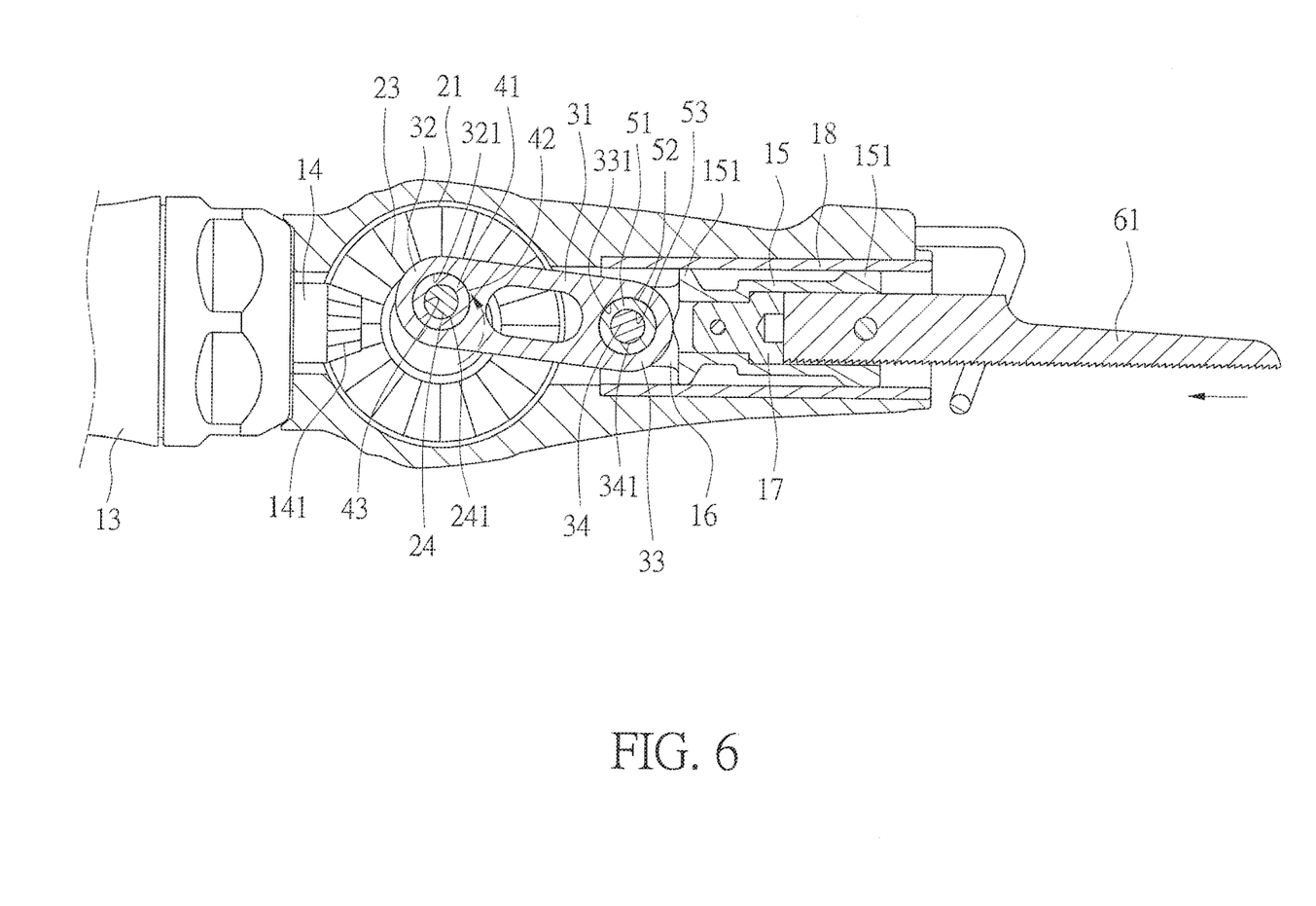

In operation, as shown in FIGS. 5 and 6, when a user turns on the pneumatic motor 13 to allow the transmission shaft 14 to drive the driving gear 21 to rotate, the protruding post 24 with eccentric configuration rotates around the axis of the driving gear 21. The first end 32 of the linking bar 31 is pivotally connected with the protruding post 24, and the second end 33 of the linking bar 31 is pivotally connected with the connecting portion 16 of the connecting member 15, so that the first end 32 and the second end 33 of the linking bar 31 respectively form joints. Therefore, when the protruding post 24 rotates, the protruding post 24 drives the linking bar 31 to take the connecting member 15 to perform a reciprocate motion in the axial direction of the tubular member 18.

Furthermore, the linking bar 31 respectively comprises the first slidable member 41 and the second slidable member 51 formed by needle roller bearings at the joint portions of two ends (i.e., the first through hole 321 and the second through hole 331). Therefore, the rotation of the linking bar 31 can be achieved in a smooth manner. In addition, the post body 241 of the protruding post 24 is inserted into the first slidable member 41 and abutted against the first inner wall 43 of the first slidable member 41, and the post body 341 of the positioning post 34 is inserted into the second slidable member 51 and abutted against the second inner wall 53 of the second slidable member 51, so that a pin-joint connection is formed between the protruding post 24 and the first slidable member 41 and another pin-joint connection is formed between the positioning post 34 and the second slidable member 51. Therefore, the joint portions are free of gaps, and the connecting member 15 can be efficiently limited to perform a reciprocate motion along the axial direction of the tubular member 18 without deflection. Accordingly, the pneumatic tool can perform the transmission efficiently. Moreover, because unwanted deflection can be prevented during the operation, the wearing of components and the noise issue can be further prevented.

What is claimed is:

1. A pneumatic tool, comprising:
    a main body being hollowed and having a receiving space, wherein one of two ends of the main body is assembled with a pneumatic motor, the pneumatic motor has a transmission shaft inserted into the receiving space, the transmission shaft comprises a transmission tooth portion, a connecting member is assembled in the other end of the main body and being slidable along an axial direction of the main body, one of two ends of the connecting member toward the receiving space forms a connecting portion, and the other end of the connecting member distant from the receiving space forms a knife assembling portion;
    a driving gear rotatably assembled in the receiving space, wherein the driving gear has a gear groove portion, the gear groove portion is engaged with the transmission tooth portion, a protruding post is assembled on a portion of the driving gear from an axis of the driving gear;
    a linking bar having a first end and a second opposite to the first end, wherein the first end of the linking bar is pin-jointed to the protruding post, so that the first end of the linking bar is pivotable relative to the protruding post, the first end of the linking bar is not shiftable relative to the protruding post, the second end of the linking bar is pin-jointed to the connecting portion of the connecting member, so that the second end of the linking bar is pivotable relative to the connecting portion of the connecting member, the second end of the linking bar is not shiftable relative to the connecting portion of the connecting member; and
    wherein the first end of the linking bar has a first through hole, and a first slidable member is received in the first through hole, the first slidable member is hollowed and ring shaped, and the first slidable member has a first outer wall and a first inner wall, a shape of an outer periphery of the first outer wall corresponds to a shape of an inner periphery of the first through hole, the first outer wall of the first slidable member is abutted against the inner periphery of the first through hole, the protruding post has a post body, and a shape of the first inner wall corresponds to a shape of the post body of the protruding post, the post body of the protruding post is inserted into the first slidable member and abutted against the first inner wall of the first slidable member, and wherein the second end of the linking bar has a second through hole, and a second slidable member is received in the second through hole, the second slidable member is hollowed and ring shaped, and the second slidable member has a second outer wall and a second inner wall, a shape of an outer periphery of the second outer wall corresponds to a shape of an inner periphery of the second through hole, the second outer wall of the second slidable member is abutted against the inner periphery of the second through hole, a positioning post has a post body, and a shape of the second inner wall corresponds to a shape of the post body of the positioning post, the post body of the positioning post is inserted into the connecting portion and the second through hole of the linking bar, and the post body of the positioning post is abutted against the second inner wall of the second slidable member.

2. The pneumatic tool according to claim 1, wherein the knife assembling portion is formed by an engaging block inserted into the other end of the connecting member, and the engaging block has a cut groove for engaging with a knife.

3. The pneumatic tool according to claim 1, wherein a tubular member being hollowed and tubular shaped is fixedly assembled in the other end of the main body, the connecting member is inserted into the tubular member, two protruding ring portions are formed at an outer periphery of the connecting member and spaced from each other, the two protruding ring portions of the connecting member are abutted against an inner wall of the tubular member, respectively.

4. The pneumatic tool according to claim 1, wherein the connecting portion is formed by two protruding ear portions spaced from each other, and the two protruding ear portions have openings defined along a same axial direction, the second end of the linking bar is extended between the two protruding ear portions of the connecting portion, the second through hole and the openings of the two protruding ear portions are aligned in the same axial direction, and the post body of the positioning post is inserted into the openings and the second through hole.

5. The pneumatic tool according to claim 1, wherein the first slidable member and the second slidable member are needle roller bearings, respectively.

* * * * *